(12) United States Patent
Rudkowski et al.

(10) Patent No.: US 9,158,785 B1
(45) Date of Patent: Oct. 13, 2015

(54) MANAGING AND SYNCHRONIZING CONTENT BETWEEN A DOCUMENT SHARING PLATFORM AND AN ENTERPRISE SOCIAL PLATFORM

(71) Applicant: Edifire LLC, Boston, MA (US)

(72) Inventors: Marc Rudkowski, Apex, NC (US); Kathleen Goodyear, Morrisville, NC (US)

(73) Assignee: Edifire LLC, Boston, MA (US)

( * ) Notice: Subject to any disclaimer, the term of this patent is extended or adjusted under 35 U.S.C. 154(b) by 0 days.

(21) Appl. No.: 14/493,196

(22) Filed: Sep. 22, 2014

(51) Int. Cl.
*G06F 17/30* (2006.01)
*G06F 17/00* (2006.01)
*H04L 29/08* (2006.01)

(52) U.S. Cl.
CPC .......... *G06F 17/30174* (2013.01); *H04L 67/10* (2013.01)

(58) Field of Classification Search
CPC ..... G06Q 10/10; G06Q 10/06; G06Q 10/109; G06Q 10/1095; G06Q 10/101; G06Q 10/107; G06Q 50/01; G06Q 10/0631; G06Q 10/063114; G06Q 10/063116; G06Q 10/103; G06Q 10/1097; G06F 17/24; G06F 21/31; G06F 3/0486; G06F 17/30011; G06F 17/30581

USPC ........................................ 707/608; 726/7, 28
See application file for complete search history.

(56) References Cited

U.S. PATENT DOCUMENTS

| | | | |
|---|---|---|---|
| 8,666,826 B2 | 3/2014 | Narayanan et al. | |
| 2012/0210247 A1 | 8/2012 | Khouri et al. | |
| 2013/0018904 A1 | 1/2013 | Mankala et al. | |
| 2013/0091204 A1 | 4/2013 | Loh et al. | |
| 2013/0318207 A1 | 11/2013 | Dotter | |
| 2013/0318589 A1* | 11/2013 | Ford et al. | 726/7 |
| 2014/0047560 A1* | 2/2014 | Meyer et al. | 726/28 |
| 2014/0245015 A1 | 8/2014 | Velamoor et al. | |

* cited by examiner

*Primary Examiner* — Yicun Wu
(74) *Attorney, Agent, or Firm* — Proskauer Rose LLP

(57) ABSTRACT

Described herein are methods, systems, and computer program products for managing and synchronizing content between a document sharing platform and an enterprise social platform. A connector module of a server computing device receives a request to transmit one or more files between the document sharing platform and the enterprise social platform. The connector module synchronizes the files between the document sharing platform and the enterprise social platform. The connector module validates the files for compliance with one or more of: a document retention policy and a digital loss prevention policy.

28 Claims, 7 Drawing Sheets

MANAGING AND SYNCHRONIZING CONTENT BETWEEN A DOCUMENT SHARING PLATFORM AND AN ENTERPRISE SOCIAL PLATFORM

FIELD OF THE INVENTION

This application relates generally to methods and apparatuses, including computer program products, for managing and synchronizing content between a document sharing platform and an enterprise social platform.

BACKGROUND

As enterprises like corporations continue to leverage digital file sharing, collaboration, mobile, and social platforms, the ability to share files between multiple client devices and enterprise systems in a secure and synchronized manner requires a well-formed and efficient integration between the various platforms operated by the enterprise, including document sharing platforms and enterprise social platforms. In addition, important objectives such as regulatory compliance and associated document retention, as well as security efforts like data loss prevention (DLP), need to be integrated into an enterprise's document sharing methodology

SUMMARY OF THE INVENTION

Therefore, there is a need for a system and method for managing and synchronizing content between a document sharing platform and an enterprise social platform. The systems, methods, and techniques described herein provide the advantages of:
- Enabling an enterprise to manage sophisticated workflows, state and metadata around binary files, text files, and documents between multiple enterprise systems;
- Addressing the ability to manage large file types/folders to meet regulatory, compliance, and risk requirements;
- Synchronizing state and metadata of documents between document sharing platforms and enterprise social platforms systems where the documents come in via connected and/or offline access;
- Providing mapping of documents between multiple information management hierarchies;
- Providing the ability to support bulk uploads of files/documents to various systems;
- Managing authentication/impersonation of access roles across multiple systems to support document workflows;
- Providing integrated file/format conversions required to support specific files/format types into each specific platform;
- Providing an agnostic architecture to support integration between different types of platforms such as document sharing (i.e., sync and share), enterprise social, email, retention, compliance, and DLP systems; and
- Providing self-service migration capability for documents between platforms, thereby alleviating the need to build sophisticated document migration tools between these platforms.

The invention, in one aspect, features a computerized method for managing and synchronizing content between a document sharing platform and an enterprise social platform. A connector module of a server computing device receives a request to transmit one or more files between the document sharing platform and the enterprise social platform. The connector module synchronizes the files between the document sharing platform and the enterprise social platform. The connector module validates the files for compliance with one or more of: a document retention policy and a digital loss prevention policy.

The invention, in another aspect, features a system for managing and synchronizing content between a document sharing platform and an enterprise social platform. The system includes a connector module of a server computing device that is configured to receive a request to transmit one or more files between the document sharing platform and the enterprise social platform, synchronize the files between the document sharing platform and the enterprise social platform, and validate the files for compliance with one or more of: a document retention policy and a digital loss prevention policy.

The invention, in another aspect, features a computer program product, tangibly embodied in a non-transitory computer readable storage medium, for managing and synchronizing content between a document sharing platform and an enterprise social platform. The computer program product includes instructions operable to cause a connector module of a server computing device to receive a request to transmit one or more files between the document sharing platform and the enterprise social platform, synchronize the files between the document sharing platform and the enterprise social platform, and validate the files for compliance with one or more of: a document retention policy and a digital loss prevention policy.

Any of the above aspects can include one or more of the following features. In some embodiments, synchronizing the files between the document sharing platform and the enterprise social platform comprises determining a destination platform of the files, wherein the destination platform includes either the document sharing platform or the enterprise social platform and determining whether the files are already available in the destination platform. If the files are already available in the destination platform, the files are stored in the destination platform as new versions and metadata associated with the files is updated in the destination platform. If the files are not already available in the destination platform, the files are stored in the destination platform as new files.

In some embodiments, validating the files for compliance with a document retention policy comprises identifying a person having access to the files based upon the request to transmit, determining whether the person having access to the files is associated with the document retention policy, and storing information about the identified person, information about the request to transmit, and the files in a compliance platform. In some embodiments, the information about the identified person comprises an identity, a job title, a job role, a group, and a compliance status. In some embodiments, the information about the request to transmit comprises a timestamp, a sender, and a recipient.

In some embodiments, validating the files for compliance with a digital loss prevention policy comprises analyzing the files using the digital loss prevention policy to determine whether the files contain confidential data, and determining whether to allow transmission of the files if the files contain confidential data. In some embodiments, the connector module determines whether the files comply with a size requirement of the enterprise social platform and generates a link for each of the files in the enterprise social platform if the files exceed the size requirement, wherein the link points to the location of the file in the document sharing platform.

In some embodiments, the request to transmit one or more files is received from a remote computing device. In some embodiments, the one or more files are stored in either the document sharing platform or the enterprise social platform, and the request to transmit is received by the connector module before or at the same time as the files are stored. In some embodiments, a remote computing device transmits the one or more files for storage in either the document sharing platform or the enterprise social platform before or at the same time as the request to transmit is received by the connector module. In some embodiments, the remote computing device transmits all of the files in a bulk transmission.

In some embodiments, the files comprise one or more of: text files, binary files and document files. In some embodiments, the connector module authenticates the request to transmit before synchronizing the files between the document sharing platform and the enterprise social platform. In some embodiments, authenticating the request to transmit comprises verifying credentials received with the request to transmit, wherein the credentials identify one or more of: a sender of the request to transmit and a computing device associated with the request to transmit, and refusing the request to transmit if the credentials cannot be verified.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
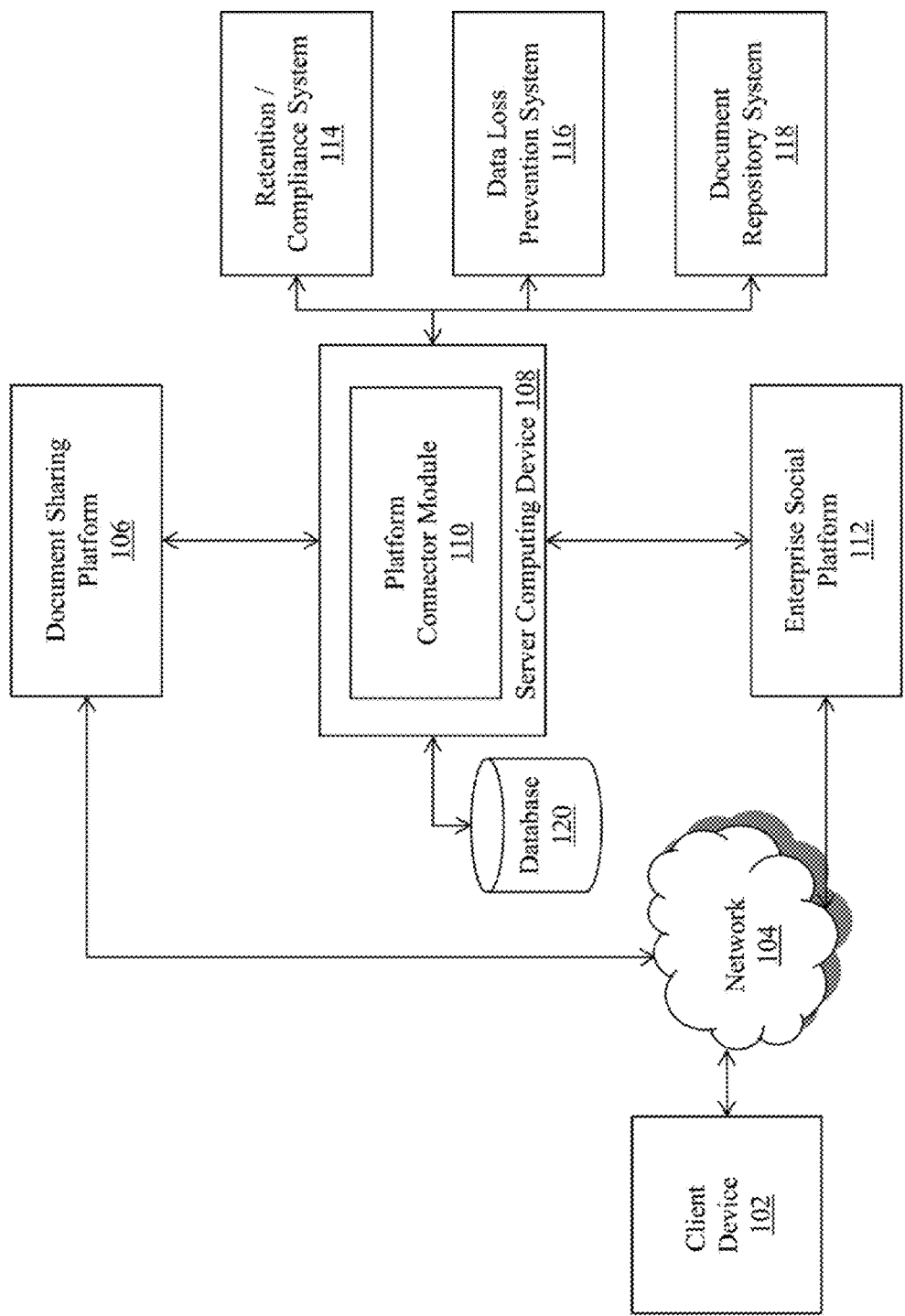
FIG. 1 is a block diagram of a system for managing and synchronizing content between a document sharing platform and an enterprise social platform.

FIG. 1 is a block diagram of a system 100 for managing and synchronizing content (e.g., documents, binary files, text files, and other types of content) between a document sharing platform and an enterprise social platform. The system 100 includes a client computing device 102, a communications network 104, a document sharing platform 106, a server computing device 108 with a platform connector module 110, an enterprise social platform 112, a retention/compliance system 114, a digital loss prevention system 116, a document repository system, and a database 120.

The client device 102 connects to the document sharing platform 106 and/or the enterprise social platform 112 (e.g., via network 104) to upload content to, and download content from, the respective platforms 106, 112. Exemplary client devices include desktop computers, laptop computers, tablets, mobile devices, smartphones, and internet appliances. It should be appreciated that other types of computing devices that are capable of connecting to the document sharing platform 106 and/or the enterprise social platform 112 can be used without departing from the scope of invention. Also, although FIG. 1 depicts only a single client device 102, it should be appreciated that a plurality of client devices can be used in the system 100 without departing from the scope of invention.

The communications network 104 couples the client device 102 to the document sharing platform 106 and/or the enterprise social platform 112. The network 104 may be a local network, such as a LAN, or a wide area network, such as the Internet or the World Wide Web, among others.

The document sharing platform 106 enables client devices to upload content for sharing with and distribution to other users of the system upon request. In some embodiments, Exemplary document sharing platforms include sync and share platforms, cloud storage platforms, file sharing platforms, and collaboration platforms, such as Dropbox™ available from Dropbox, Inc. of San Francisco, Calif., Box available from Box, Inc. of Los Altos, Calif., and SharePoint™ available from Microsoft Corp. of Redmond, Wash. It should be appreciated that the document sharing platform 106 can be a proprietary solution that includes elements of the above-referenced example platforms.

The server computing device 108 is a combination of hardware and software modules for managing and synchronizing content between the document sharing platform 106 and the enterprise social platform 112, and also managing the content with respect to the retention/compliance system 114, the data loss prevention system 116, and the document repository system 118. The server computing device 108 includes a platform connector module 110. The module 110 is a hardware and/or software module that resides on the server computing device 108 to perform functions associated with managing and synchronizing content between the document sharing platform 106 and the enterprise social platform 112, and also communicating with the systems 114, 116, 118 to perform additional workflow tasks with respect to the content exchanged between the platforms 106, 112.

As will be described in greater detail below regarding FIG. 3, the platform connector module 110 can comprise a plurality of sub-modules that each performs one or more tasks. In some embodiments, the functionality of the module 110 and/or its sub-modules is distributed among a plurality of computing devices. In addition, although the platforms 106, 112 and systems 114, 116, 118 are shown in FIG. 1 as being separate from server computing device 108, it should be appreciated that the platforms 106, 112 and/or systems 114, 116, 118 can be located on the server computing device 108, in some embodiments. It should be appreciated that any number of computing devices, arranged in a variety of architectures, resources, and configurations (e.g., cluster computing, virtual computing, cloud computing) can be used without departing from the scope of the invention.

The enterprise social platform 112 is a software platform that enables members of an organization, such as a corporation, to efficiently collaborate and communicate using a variety of social-based tools such as blogs, wikis, forums, links, chat/messaging, data feeds, and the like. Often, files, documents, and other types of content are included or embedded in the enterprise social platform 112 as part of the collaboration and communication process. Exemplary enterprise social platforms include Jive™ available from Jive Software, Inc. of Palo Alto, Calif., Yammer™ available from Microsoft Corp. of Redmond, Wash., and eXo Platform™ available from eXo Inc. of San Francisco, Calif. It should be appreciated that the enterprise social platform 112 can be a proprietary solution that includes elements of the above-referenced example platforms.

The retention/compliance system 114 provides the capability of monitoring content exchanged between the platforms 106, 112 to determine compliance with, e.g., governmental regulations such as those propagated by the Securities and Exchange Commission (SEC) or the Financial Industry Regulatory Authority (FINRA). For example, certain entities in the financial services space are required to maintain adequate record keeping and supervision of electronic communications made by their employees. In some embodiments, the retention/compliance system 114 is configured with a document retention policy that defines the entity's retention requirements and preferences for electronic communications. For example, the document retention policy can define, e.g., (i) the identity of employees/roles/groups/job titles that are either required to be monitored for compliance purposes or which the entity prefers to monitor; (ii) the categories of data that must be monitored/stored/archived (e.g., content, metadata, access permissions, audit log, CDR, encryption hash data); and (iii) the policies regarding storage and maintenance of archived data. The platform connector module 110 can communicate with the retention/compliance system 114 to enable accurate monitoring and tracking of content and communications between users of the platforms 106, 112 in order to ensure compliance requirements are being met.

The data loss prevention (DLP) system 116 provides the capability of detecting potential data breaches or unintended transmissions of sensitive/confidential data when content is exchanged between the platforms 106, 112. The platform connector module 110 can communicate with the DLP system 116 to enable analysis and filtering of content and communications between users of the platforms 106, 112 in order to (i) determine whether any sensitive data is included in the exchanged content and (ii) prevent unauthorized or accidental dissemination of the sensitive data.

The document repository system 118 provides the capability of storing documents, files, and other content exchanged between the platforms 106, 112 either on a temporary, as-needed basis (e.g., as documents are being transferred from one platform to the other) or a permanent basis (e.g., for tracking, monitoring, or archival purposes). In one example, the retention/compliance system 114 in conjunction with the platform connector module 110 may determine that one or more files exchanged between the platforms 106, 112 fall within the company's compliance profile and must be saved. The module 110 can store the files in the document repository system 118 along with metadata describing the file at the time it was exchanged and other relevant data with respect to the compliance monitoring.

The system 100 also includes a database 120. The database 120 is coupled to the server computing device 108 and stores data used by the server computing device 108 and/or the platform connector module 110 to perform functions associated with managing and synchronizing content between the document sharing platform 106 and the enterprise social platform 112, and also managing the content with respect to the retention/compliance system 114, the data loss prevention system 116, and the document repository system 118. The database 120 can be integrated with the server computing device 108 or be located on a separate computing device. An example database that can be used with the system 100 is MySQL™ available from Oracle Corp. of Redwood City, Calif.

Figure 2:
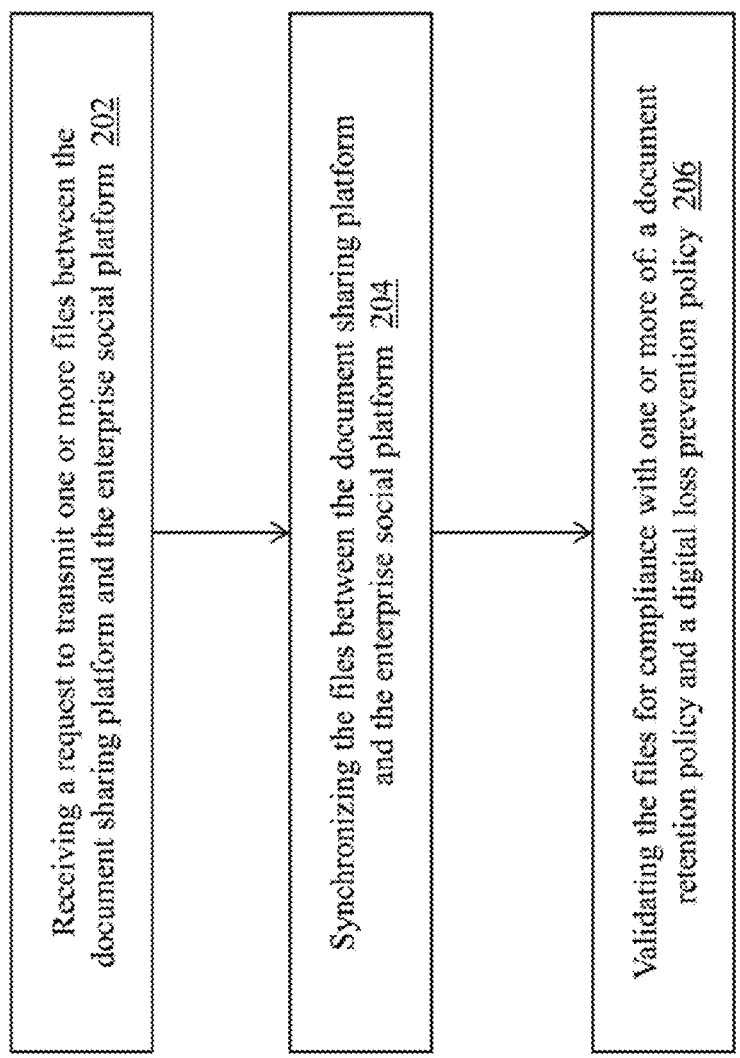
FIG. 2 is a flow diagram of a method for managing and synchronizing content between a document sharing platform and an enterprise social platform.

FIG. 2 is a flow diagram of a method 200 for managing and synchronizing content between a document sharing platform 106 and an enterprise social platform 112, using the system 100 of FIG. 1. The platform connector module 110 receives (202) a request to transmit one or more files between the document sharing platform 106 and the enterprise social platform 112. For example, a user a client device 102 can upload files to the document sharing platform 106 for inclusion on a blog post being hosted by the enterprise social platform 112. Upon uploading the files, the client device 102 and/or the document sharing platform 106 can instruct the connector module 110 to transmit the files to the appropriate location on the enterprise social platform 112 by sending a request to transmit to the connector module 110. It should be appreciated that other types of content (documents, text files, binary files, media files) can be transferred between the platforms 106, 112 without departing from the scope of invention.

It should also be appreciated that the connector module 110 can automatically initiate transfer of files from one platform to the other without receiving a request from the client device 102. For example, upon uploading of files to the document sharing platform 106, the connector module 110 can receive a notification from the platform 106 that new files (or new versions of files) have been received and can be synchronized with the platform 112. In another example, the connector module 110 can monitor the state of the respective platforms 106, 112 to determine when new or updated content is available for synchronization between the platforms (as will be described in greater detail below regarding FIG. 3).

The connector module 110 synchronizes (204) the files between the document sharing platform 106 and the enterprise social platform 112. As will be described in greater detail with respect to FIG. 4, the connector module 110 determines whether the files are already available on the destination platform and can store the files as new versions on the destination platform or store the files as new files on the destination platform. In addition, the connector module 110 can determine whether the destination platform is capable of storing the files as-is or whether the files require compression, conversion, partitioning, or another type of modification in order to store the files on the destination platform. In some cases, the destination platform may not be able to store the files and the connector module 110 can store the files in the document repository system 118 or provide a link in the destination platform back to the original storage location of the files.

Further, the synchronization process includes in some embodiments the storage of metadata associated with the files, such as version information, author information, recipient information, timestamp, file extension, and the like. In some embodiments, the files are encrypted by the connector module 110 prior to being stored in the destination platform and/or the files are decrypted by the connector module 110 upon being received from the origination platform.

The connector module 110 also validates (206) the files for compliance with one or more of: a document retention policy and a data loss prevention policy. As mentioned above, the connector module 110, in conjunction with the retention/compliance system 114, can determine whether transfer of the files invokes a document retention policy maintained by the entity that manages the system 100. For example, the connector module 110 can analyze the sender of the files, the recipient of the files, and the content of the files—including relevant information such as the job roles or titles of the sender and recipient, the organization to which the sender and recipient belong, and other such characteristics—to determine whether transfer of the files and the files themselves must be tracked according to the entity's compliance requirements. The connector module 110 can then take appropriate steps, such as archiving the transmitted files and related metadata in the document repository system 118, keeping a record of the transmission in the retention/compliance system 114, and issuing a notification to interested parties that the transmission was initiated or executed.

Also, as mentioned above, the connector module 110, in conjunction with the DLP system 114, can determine whether transfer of the files invokes a data loss prevention policy maintained by the entity that manages the system 100. For example, if one of the files contains company confidential or sensitive information, and the intended recipient of the file is outside of the company (and not entitled to receive the confidential information), the connector module 110 can analyze the file to determine the existence of the confidential information and prevent the transfer from completing. The connector module 110 can also issue a notification to appropriate parties that the confidential information was being sent and subsequently stopped by the system from being transmitted.

Figure 3:
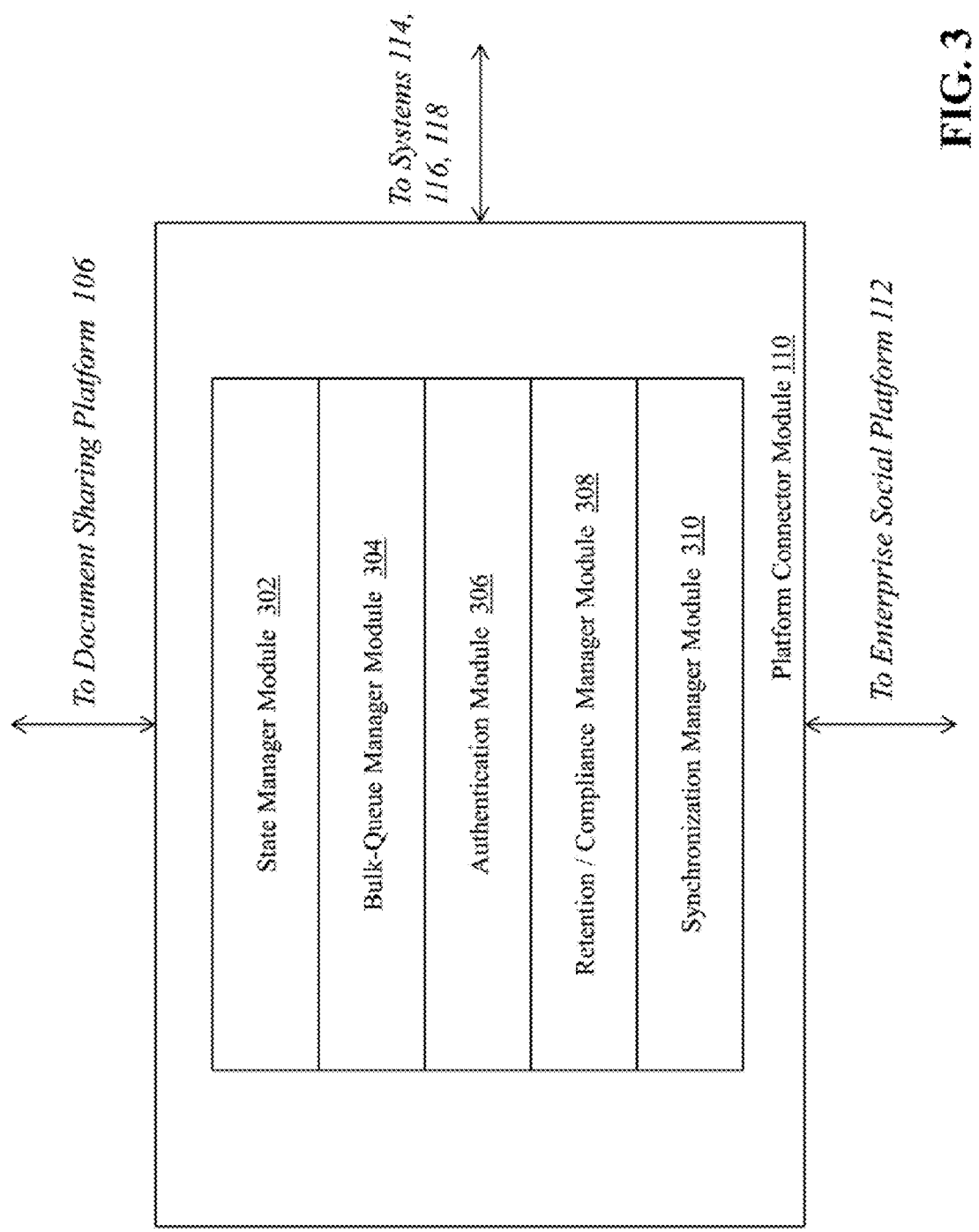
FIG. 3 is a detailed block diagram of the connector module.

FIG. 3 is a detailed block diagram of the connector module 110 of FIG. 1. As shown in FIG. 3, the connector module in some embodiments can include a plurality of sub-modules 302, 304, 306, 308, 310 that perform one or more functions associated with managing and synchronizing content between the document sharing platform 106 and the enterprise social platform 112, and also managing the content with respect to the retention/compliance system 114, the DLP system 116, and the document repository system 118. The modules include a state manager module 302, a bulk-queue manager module 304, an authentication module 306, a retention/compliance manager module 308, and a synchronization manager module 310.

In some embodiments, the functionality of the modules 302, 304, 306, 308, 310 is distributed among a plurality of computing devices. It should also be appreciated that, in some embodiments, the functionality of the modules 302, 304, 306, 308, 310 can be distributed such that any of the modules 302, 304, 306, 308, 310 is capable of performing any of the functions described herein without departing from the scope of the invention. For example, in some embodiments, the functionality of the modules 302, 304, 306, 308, 310 can be merged into a single module.

The state manager module 302 performs operations associated with monitoring the state of the respective platforms 106, 112 to determine when new or updated content is available for synchronization between the platforms. For example, if a user at client device 102 uploads files to the document sharing platform 106, the state manager module 302 can detect the uploaded files and perform an automatic synchronization process to transfer the files to the enterprise social platform 112 and perform any necessary versioning with respect to the files. In some embodiments, the state manager module 302 can periodically compare the contents of the document sharing platform 106 and the enterprise social platform 112 to determine whether any files are out of sync and make appropriate updates as necessary.

The bulk-queue manager module 304 performs operations associated with storing files in the respective platforms 106, 112 (and, in some embodiments, the document repository system 118). The bulk-queue manager module 304 can receive a plurality of files from one of the platforms 106, 112 and perform a bulk transfer of the files to the destination platform—instead of requiring a separate transfer for each file. Also, the bulk-queue manager module 304 can coordinate file transfer efficiently by managing a queue for storage of the files between the platforms 106, 112 to prevent or reduce the occurrence of file conflicts or inadvertent data overwrites. For example, if a user at client device 102 uploads a first version of a file to the document sharing platform 106 and requests transmission of the file to the enterprise social platform 112, while a few seconds later a user at another client device uploads a second version of the same file to the document sharing platform and requests transmission of the file to the enterprise social platform 112, the bulk-queue manager module 304 can determine that the request from client device 102 has priority over the request from the other client device because the request from client device 102 entered the queue at an earlier time. In another example, the bulk-queue manager module 304 can determine that the second version of the file will result in a loss of changes made in the first version of the file and can refuse to store the second version of the file in the enterprise social platform 112.

The authentication module 306 performs operations associated with authenticating users and client devices that access the document sharing platform 106 and/or the enterprise social platform 112 to determine whether the users/client devices have sufficient permissions to transfer content between those platforms. For example, if a user at client device 102 uploads files to the document sharing platform 106 and submits a request to transfer the files to the enterprise social platform 112, the authentication module 306 can determine whether the user is authorized to transfer files to the platform 112. In some embodiments, the authentication module 306 can validate that the users of the enterprise social platform 112 that receive access to the transferred files are indeed authorized to have such access.

The retention/compliance manager module 308 works in conjunction with the retention/compliance system 114 as described above to perform functions associated with managing and tracking the transfer of files between the platforms 106, 112 to ensure compliance with a document retention policy.

The synchronization manager module 310 performs operations associated with version management of files during transfer between the platforms 106, 112. As will be described in greater detail below regarding FIG. 4, the module 310 can determine whether the files are already available on the destination platform and can store the files as new versions on the destination platform or store the files as new files on the destination platform. In addition, the module 310 can determine whether the destination platform is capable of storing the files as-is or whether the files require compression, conversion, partitioning, or another type of modification in order to store the files on the destination platform. In some cases, the destination platform may not be able to store the files and the module 310 can store the files in the document repository system 118 or provide a link in the destination platform back to the original storage location of the files.

Figure 4:
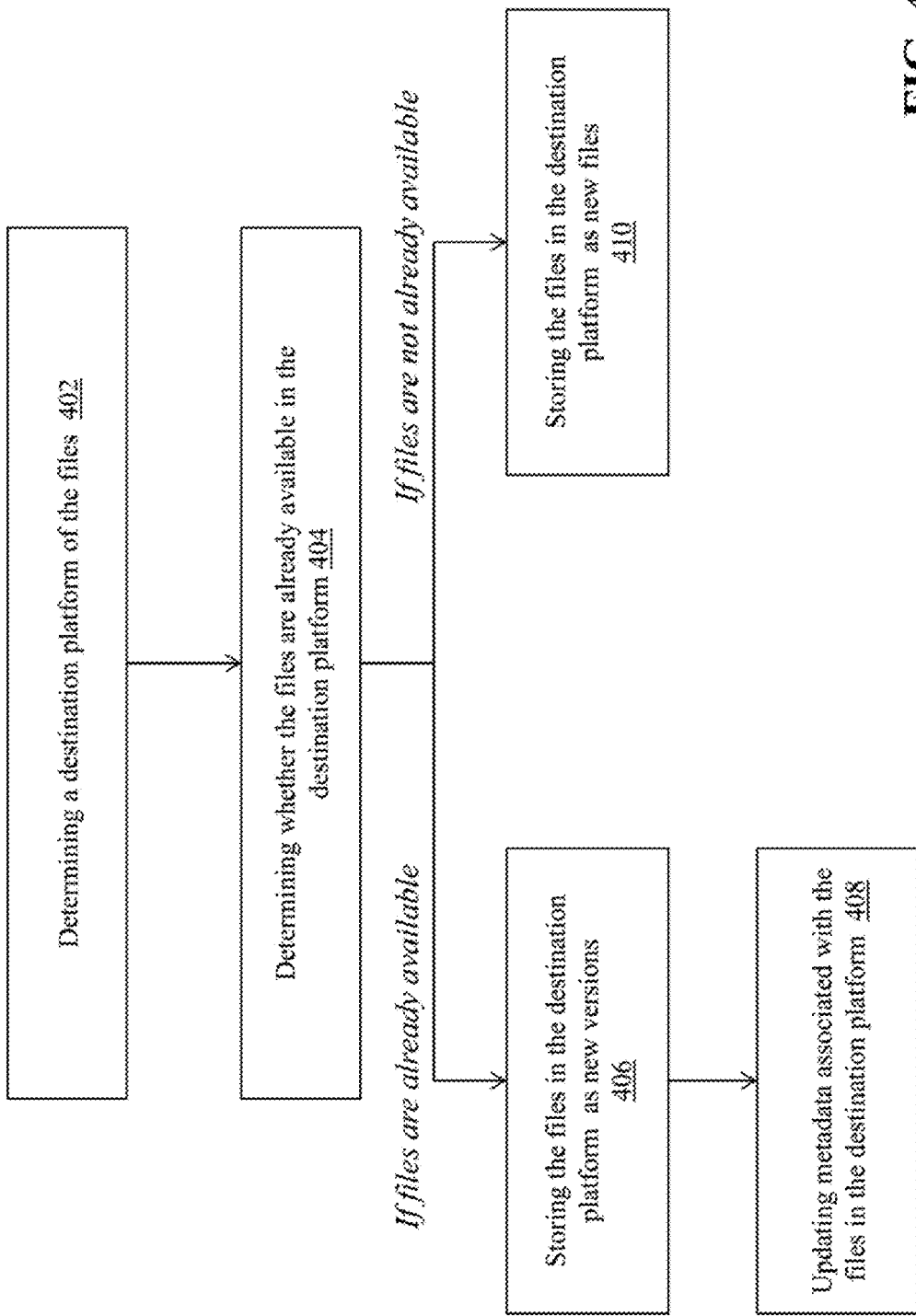
FIG. 4 is a flow diagram of a method for synchronizing files between the document sharing platform and the enterprise social platform.

FIG. 4 is a flow diagram of a method 400 for synchronizing files between the document sharing platform 106 and the enterprise social platform 112 of FIG. 1. A user at client device 102 uploads files to either the document sharing platform 106 or the enterprise social platform 112 and submits a request to transfer the files to the other platform. As shown in FIG. 4, the connector module 110 determines (402) a destination platform of the files—that is, to which platform should the files be transferred. For example, if the files are uploaded to the document sharing platform 106, the destination platform is the enterprise social platform 112, and vice versa.

The connector module 110 determines (404) whether the files are already available in the destination platform. For example, the connector module 110 can determine that the uploaded file (or a version of it) exists in the destination platform, e.g., by using file comparison techniques, examining the metadata of the files to determine a match (i.e., file names, titles, document IDs, hashes and the like), and other similar methodologies.

If the files are already available in the destination platform, the connector module 110 stores (406) the files in the destination platform as new versions of the respective files. In some embodiments, the connector module 110 instructs the destination platform to retain the previous version of the files and/or archives the previous version of the files, e.g., in the document retention system 118. In some embodiments, the request to transfer that is received from the client device 102 includes an instruction to overwrite any previous versions of the files—in which case the previous versions are not saved or stored.

The connector module 110 also updates (408) metadata associated with the files in the destination platform. For example, the connector module 110 can update the metadata to include information such as a last updated timestamp, an author of the new version, an audit trail of changes to the file, and other similar information.

If the files are not already available in the destination platform, the connector module 110 can store (410) the files in the destination platform as new files. For example, a user at client device 102 uploads a newly-created file to the document sharing platform 106 for inclusion as a reference in a blog post on the enterprise social platform 112. The connector module 110 stores the file in the enterprise social platform 112 as a new record.

The following are exemplary use cases describing various workflows for managing and synchronizing content between a document sharing platform and an enterprise social platform using the system of FIG. 1.

Figure 5:
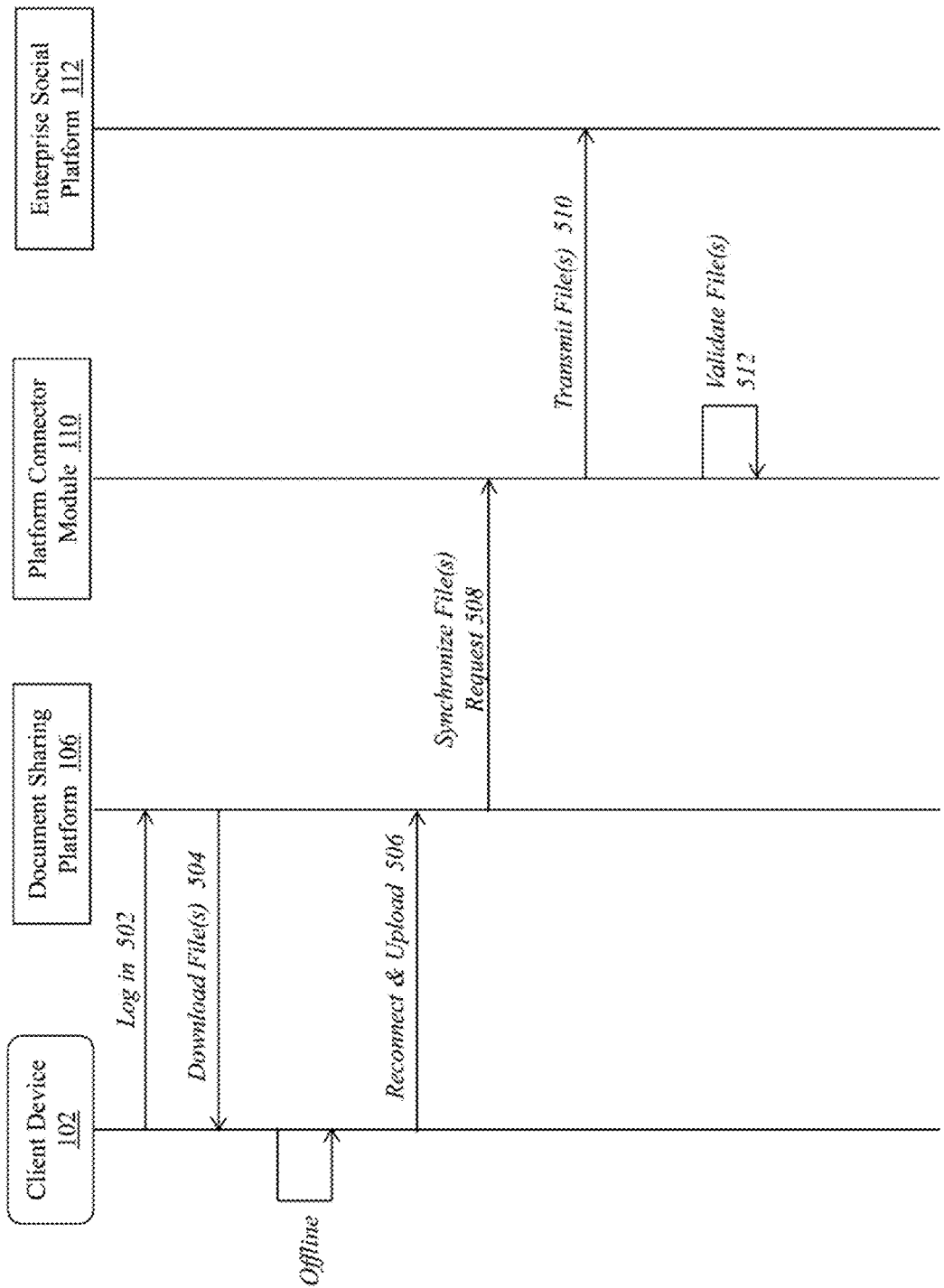
FIG. 5 is a workflow for synchronizing content after mobile offline access.

FIG. 5 is a workflow for synchronizing content after mobile offline access, using the system 100 of FIG. 1. In this use case, a user at client device 102 logs in (502) to the document sharing platform 106 (e.g., via a mobile application on the client device 102) and downloads one or more files to the device 102. The client device 102 is then disconnected from the document sharing platform 106.

While offline, the user makes changes to the files and saves the changed files on the client device 102. At a later time, the client device 102 reconnects (506) and uploads the changed files to the document sharing platform 106. The connector module 110 receives a request (508) from the document sharing platform 106 to synchronize the files to the enterprise social platform 112. The connector module 110 transmits (510) the files to the enterprise social platform 112 (e.g., as new files or new versions of the files). The connector module 110 also validates (512) each file via interoperation with, e.g., the compliance/retention system 114 and the DLP system 116, as described previously, to ensure compliance with any data retention and/or data loss prevention policies in place. As a result, the system 100 enables users to make changes to files on a mobile device—without requiring the users to maintain an active connection to the system 100—and then providing the advantage of seamlessly synchronizing and monitoring the files when the mobile device reconnects and uploads the changed files.

Figure 6:
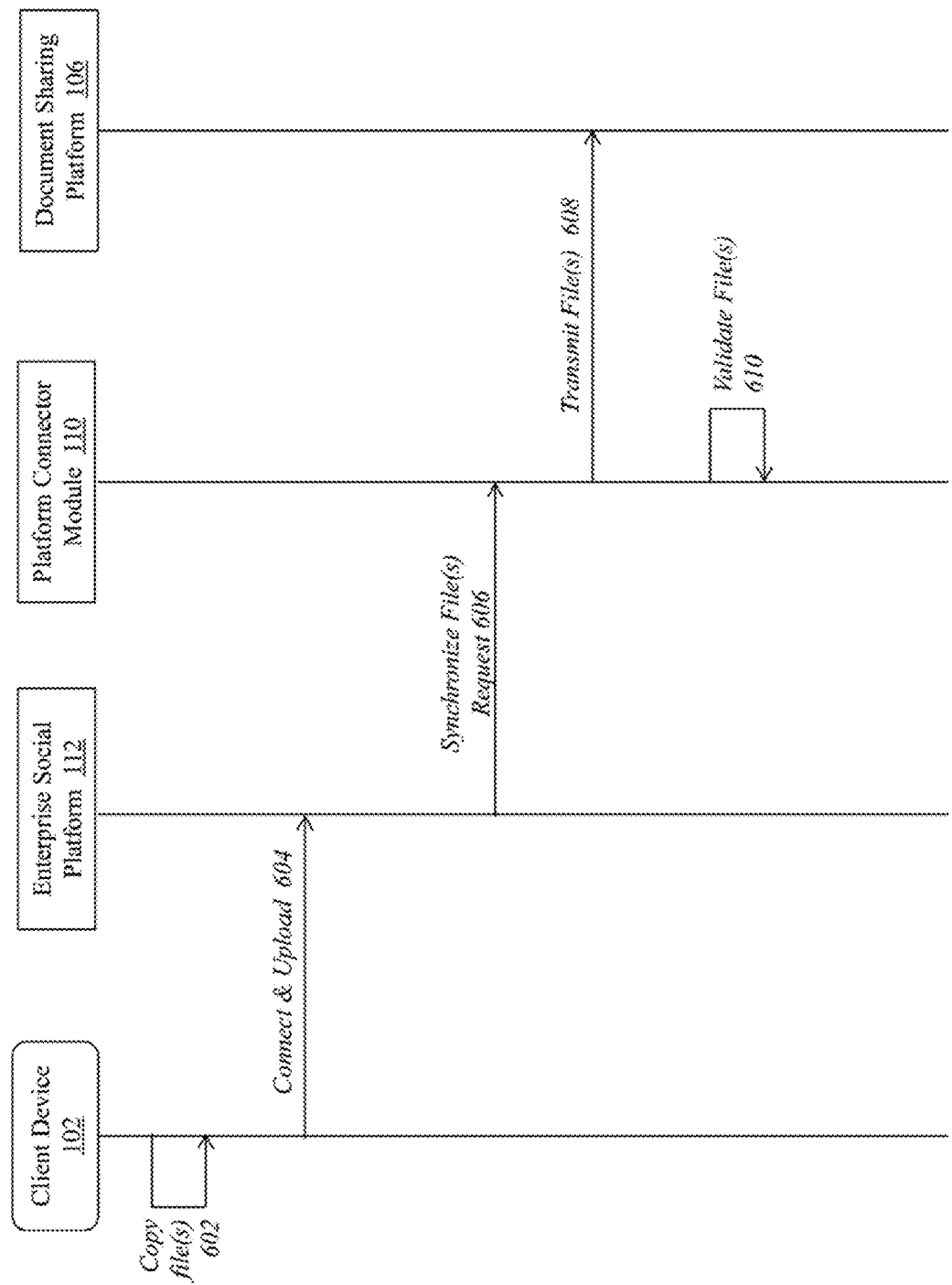
FIG. 6 is a workflow for bulk file upload.

FIG. 6 is a workflow for bulk file upload, using the system 100 of FIG. 1. In this use case, a user at client device 102 needs to migrate a plurality of files into the enterprise social platform 112 from a storage module mounted on the client device 102, e.g., a network-coupled document repository or file share. The user copies (602) the desired files into a designated folder on the client device 102. For example, the user can drag the files (or even an entire folder structure with files in various locations) into the designated folder. The client device 102 is configured to automatically connect (604) to the enterprise social platform 112, when files/folder structures are copied into the designated folder, and upload the files/folder structures to the enterprise social platform 112. In some embodiments, the enterprise social platform 112 flattens and translates the folder structure of the copied files into, e.g., a tag with a path name such as: folderroot_level1_level2, and so forth.

The platform connector module 110 receives a request (606) to synchronize the files between the enterprise social platform 112 and the document sharing platform 106. The connector module 110 transmits (608) the files to the enterprise social platform 112 (e.g., as new files or new versions of the files). The connector module 110 also validates (610) each file via interoperation with, e.g., the compliance/retention system 114 and the DLP system 116, as described previously, to ensure compliance with any data retention and/or data loss prevention policies in place. As a result, the system 100 enables users to perform a bulk file upload from a client device to an enterprise social platform, configuring the files for use with the enterprise social platform, and then providing the advantage of seamlessly synchronizing the files with a document sharing platform 106.

Figure 7:
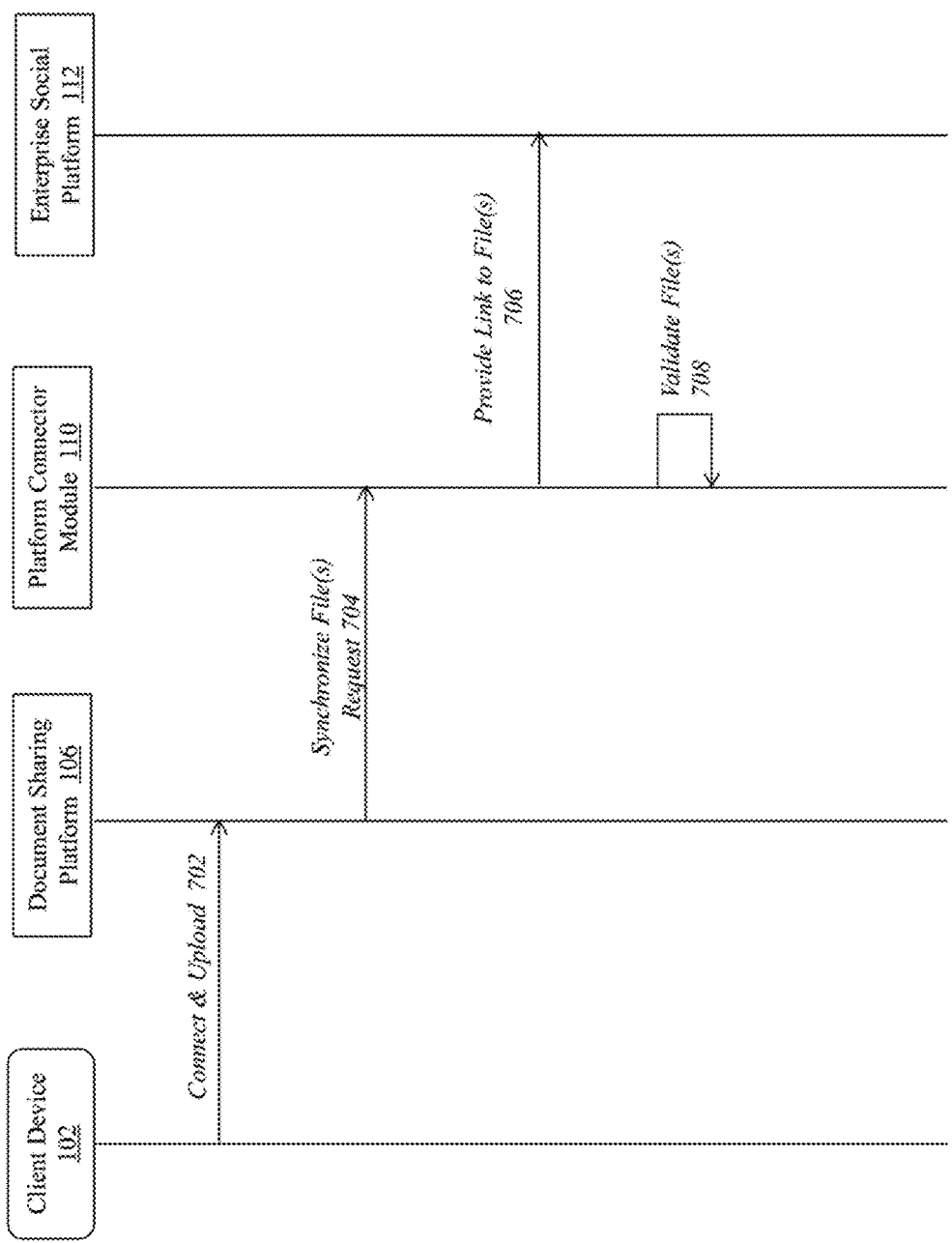
FIG. 7 is a workflow for sharing large files.

FIG. 7 is a workflow for sharing large files, using the system 100 of FIG. 1. In this use case, a user at client device 102 needs to upload files to the enterprise social platform 112—but the files are larger than a current file size limit for files uploaded to the enterprise social platform 112. The user at client device 102 connects (702) to the document sharing platform 106 and uploads the files to a designated folder on the platform 106. The designated folder is configurable, and the large file capability can be turned on or off for specific users, making the folder appear and disappear depending upon the user's permissions.

The platform connector module 110 receives a request (704) to synchronize the files between the document sharing platform 106 and the enterprise social platform 112. However, because the files have been uploaded to the designated folder—meaning they are too large for the enterprise social platform 112—the connector module 110 does not transfer the files to the enterprise social platform. Instead, the connector module 110 provides a link (706) to the files to the enterprise social platform 112 that connects back to the document sharing platform 106 where the files are stored. The connector module 110 also validates (708) each file via interoperation with, e.g., the compliance/retention system 114 and the DLP system 116, as described previously, to ensure compliance with any data retention and/or data loss prevention policies in place.

Therefore, users of the enterprise social platform can still access the files directly via the document sharing platform 106. In some embodiments, the connector module 110 can store the files in, e.g., the document repository system 118 and provide the same functionality as described above.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for managing and synchronizing content between a document sharing platform of a first server computing device and an enterprise social platform of a second server computing device, the method comprising:
   receiving, at a connector module of a third server computing device, a request to transmit one or more files between the document sharing platform and the enterprise social platform;
   synchronizing, by the connector module, the files between the document sharing platform and the enterprise social platform, including
      determining a set of file requirements of the platform receiving the files and adjusting one or more characteristics of the files to conform to the set of file requirements including determining whether the files require one or more of compression, format conversion, partitioning, versioning, or file size management before the files can be stored on the platform receiving the files, and
      determining a set of business application constraints that apply to the platform receiving the files and processing the files according to the set of business application constraints including determining a workflow for the files based upon the request to transfer and mapping the files to the platform receiving the files based upon the workflow;
   validating, by the connector module, the files for compliance with a document retention policy including identifying a set of compliance requirements defined in the document retention policy that apply to the files based upon the request to transmit and generating metadata describing transfer of the files for storage, along with the files themselves, in a compliance platform on a fourth server computing device; and
   validating, by the connector module, the files for compliance with a digital loss prevention policy including scanning textual content contained within the files to determine whether the textual content includes confidential information and stopping the files from being transmitted to another platform if the files include confidential information.

2. The method of claim 1, wherein the step of synchronizing the files between the document sharing platform and the enterprise social platform comprises:
   determining, by the connector module, whether the files are already available in the platform receiving the files;
   if the files are already available in the platform receiving the files:
      storing, by the connector module, the files in the platform receiving the files as new versions; and
      updating, by the connector module, metadata associated with the files in the platform receiving the files;
   if the files are not already available in the platform receiving the files:
      storing, by the connector module, the files in the platform receiving the files as new files.

3. The method of claim 1, wherein the step of validating the files for compliance with a document retention policy comprises:
   identifying, by the connector module, a person having access to the files based upon the request to transmit;
   determining, by the connector module, whether the person having access to the files is associated with the document retention policy; and
   storing, by the connector module, information about the identified person, information about the request to transmit, and the files in a compliance platform.

4. The method of claim 3, wherein the information about the identified person comprises an identity, a job title, a job role, a group, and a compliance status.

5. The method of claim 3, wherein the information about the request to transmit comprises a timestamp, a sender, and a recipient.

6. The method of claim 1, wherein the set of file requirements includes a size requirement of the platform receiving the files, the method further comprising:
   determining, by the connector module, whether the files comply with the size requirement; and
   generating, by the connector module, a link for each of the files in the platform receiving the files if the files exceed the size requirement, wherein the link points to the location of the file in the platform transmitting the files.

7. The method of claim 1, wherein the request to transmit one or more files is received from a remote computing device.

8. The method of claim 1, wherein the one or more files are stored in either the document sharing platform or the enterprise social platform, and the request to transmit is received by the connector module before or at the same time as the files are stored.

9. The method of claim 8, further comprising transmitting, by a remote computing device, the one or more files for storage in either the document sharing platform or the enterprise social platform before or at the same time as the request to transmit is received by the connector module.

10. The method of claim 9, wherein the remote computing device transmits all of the files in a bulk transmission.

11. The method of claim 1, wherein the files comprise one or more of: text files, binary files and document files.

12. The method of claim 1, further comprising authenticating, by the connector module, the request to transmit before synchronizing the files between the document sharing platform and the enterprise social platform.

13. The method of claim 12, wherein authenticating the request to transmit comprises:
   verifying, by the connector module, credentials received with the request to transmit, wherein the credentials identify one or more of: a sender of the request to transmit and a computing device associated with the request to transmit; and
   refusing, by the connector module, the request to transmit if the credentials cannot be verified.

14. A system for managing and synchronizing content between a document sharing platform of a first server computing device and an enterprise social platform of a second computing device, the system comprising a connector module of a third server computing device configured to:
   receive a request to transmit one or more files between the document sharing platform and the enterprise social platform;
   synchronize the files between the document sharing platform and the enterprise social platform, including
      determining a set of file requirements of the platform receiving the files and adjusting one or more characteristics of the files to conform to the set of file requirements including determining whether the files require one or more of compression, format conversion, partitioning, versioning, or file size management before the files can be stored on the platform receiving the files, and
      determining a set of application constraints that apply to the platform receiving the files and processing the files according to the set of business application constraints including determining a workflow for the files based upon the request to transfer and mapping the files to the platform receiving the files based upon the workflow;

validate the files for compliance with a document retention policy including identifying a set of compliance requirements defined in the document retention policy that apply to the files based upon the request to transmit and generating metadata describing transfer of the files for storage, along with the files themselves, in a compliance platform on a fourth server computing device; and validate the files for compliance with a digital loss prevention policy including scanning textual content contained within the files to determine whether the textual content includes confidential information and stopping the files from being transmitted to another platform if the files include confidential information.

15. The system of claim 14, wherein the step of synchronizing the files between the document sharing platform and the enterprise social platform comprises:

determining whether the files are already available in the platform receiving the files;

if the files are already available in the platform receiving the files:
storing the files in the platform receiving the files as new versions; and
updating metadata associated with the files in the platform receiving the files;

if the files are not already available in the platform receiving the files:
storing the files in the platform receiving the files as new files.

16. The system of claim 14, wherein the step of validating the files for compliance with a document retention policy comprises:

identifying a person having access to the files based upon the request to transmit;

determining whether the person having access to the files is associated with the document retention policy; and storing information about the identified person, information about the request to transmit, and the files in a compliance platform.

17. The system of claim 16, wherein the information about the identified person comprises an identity, a job title, a job role, a group, and a compliance status.

18. The system of claim 16, wherein the information about the request to transmit comprises a timestamp, a sender, and a recipient.

19. The system of claim 14, wherein the set of file requirements includes a size requirement of the platform receiving the files and the connector module is further configured to:

determine whether the files comply with the size requirement; and generate a link for each of the files in the platform receiving the files if the files exceed the size requirement, wherein the link points to the location of the file in the platform transmitting the files.

20. The system of claim 14, wherein the request to transmit one or more files is received from a remote computing device.

21. The system of claim 14, wherein the one or more files are stored in either the document sharing platform or the enterprise social platform, and the request to transmit is received by the connector module before or at the same time as the files are stored.

22. The system of claim 21, wherein a remote computing device transmits the one or more files for storage in either the document sharing platform or the enterprise social platform before or at the same time as the request to transmit is received by the connector module.

23. The system of claim 22, wherein the remote computing device transmits all of the files in a bulk transmission.

24. The system of claim 14, wherein the files comprise one or more of: text files, binary files and document files.

25. The system of claim 14, wherein the connector module is further configured to authenticate the request to transmit before synchronizing the files between the document sharing platform and the enterprise social platform.

26. The system of claim 25, wherein authenticating the request to transmit comprises:

verifying credentials received with the request to transmit, wherein the credentials identify one or more of: a sender of the request to transmit and a computing device associated with the request to transmit; and refusing the request to transmit if the credentials cannot be verified.

27. A computer program product, tangibly embodied in a non-transitory computer readable storage medium, for managing and synchronizing content between a document sharing platform of a first server computing device and an enterprise social platform of a second server computing device, the computer program product including instructions operable to cause a connector module of a third server computing device to:

receive a request to transmit one or more files between the document sharing platform and the enterprise social platform;

synchronize the files between the document sharing platform and the enterprise social platform, including determining a set of file requirements of the platform receiving the files and adjusting one or more characteristics of the files to conform to the set of file requirements including determining whether the files require one or more of compression, format conversion, partitioning, versioning, or file size management before the files can be stored on the platform receiving the files, and determining a set of application constraints that apply to the platform receiving the files and processing the files according to the set of business application constraints including determining a workflow for the files based upon the request to transfer and mapping the files to the platform receiving the files based upon the workflow;

validate the files for compliance with a document retention policy including identifying a set of compliance requirements defined in the document retention policy that apply to the files based upon the request to transmit and generating metadata describing transfer of the files for storage, along with the files themselves, in a compliance platform on a fourth server computing device; and validate the files for compliance with a digital loss prevention policy including scanning textual content contained within the files to determine whether the textual content includes confidential information and stopping the files from being transmitted to another platform if the files include confidential information.

28. The method of claim 1, wherein the application constraints comprise authentication of credentials and access roles, document lifecycle management rules, business workflow rules, and software application integration policies.

* * * * *